United States Patent
Natus et al.

(10) Patent No.: US 8,888,478 B2
(45) Date of Patent: *Nov. 18, 2014

(54) PELLETIZING PRESS FOR PRODUCING PELLETS

(75) Inventors: Gunter Natus, Muhltal (DE); Frank Heymanns, Oberderdingen (DE); Gernot von Haas, Heidelberg (DE)

(73) Assignee: Dieffenbacher GmbH Maschinen- und Anlagenbau, Eppingen (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/498,545

(22) PCT Filed: Sep. 30, 2010

(86) PCT No.: PCT/EP2010/005984
§ 371 (c)(1),
(2), (4) Date: Jun. 6, 2012

(87) PCT Pub. No.: WO2011/038918
PCT Pub. Date: Apr. 7, 2011

(65) Prior Publication Data
US 2012/0244240 A1    Sep. 27, 2012

(30) Foreign Application Priority Data
Sep. 30, 2009   (DE) .......................... 10 2009 047 811

(51) Int. Cl.
*B30B 11/28* (2006.01)
*B30B 11/20* (2006.01)
*B30B 11/22* (2006.01)

(52) U.S. Cl.
CPC .............. *B30B 11/228* (2013.01); *Y02E 50/10* (2013.01); *B30B 11/202* (2013.01); *Y02E 50/30* (2013.01); *B30B 11/221* (2013.01)
USPC .......................................... 425/193; 425/331

(58) Field of Classification Search
USPC .................................................. 425/193, 331
See application file for complete search history.

(56) References Cited

U.S. PATENT DOCUMENTS 2,171,039 A * 8/1939 Meakin ......................... 425/331
2,178,009 A   10/1939 Helm
(Continued)

FOREIGN PATENT DOCUMENTS

CN    101288986 A    10/2008
CN    201192904 Y    2/2009
(Continued)

OTHER PUBLICATIONS

International Search Report dated Jan. 19, 2011, as received in corresponding PCT Application No. PCT/EP2010/005984, 6 pages.
(Continued)

*Primary Examiner* — James Mackey
(74) *Attorney, Agent, or Firm* — Foley & Lardner LLP

(57) ABSTRACT

A pelletizing press for producing pellets, preferably from biomass, for use as fuel in fireplaces, includes at least one die having a plurality of bores for pressing the biomass, at least one roll rolling on a rolling surface of the die, and at least one drive device for the die and/or the roll. The pelletizing press makes it possible to use a die having as low a height as possible, and thus as short a bore length as possible. For mounting the die, a carrier plate seated in a substantially planar manner against the die is arranged downstream of the die in the passage direction of the biomass. At least one opening for releasing the bores of the die is arranged in the carrier plate.

20 Claims, 3 Drawing Sheets

(56) References Cited

U.S. PATENT DOCUMENTS

Figure 1:
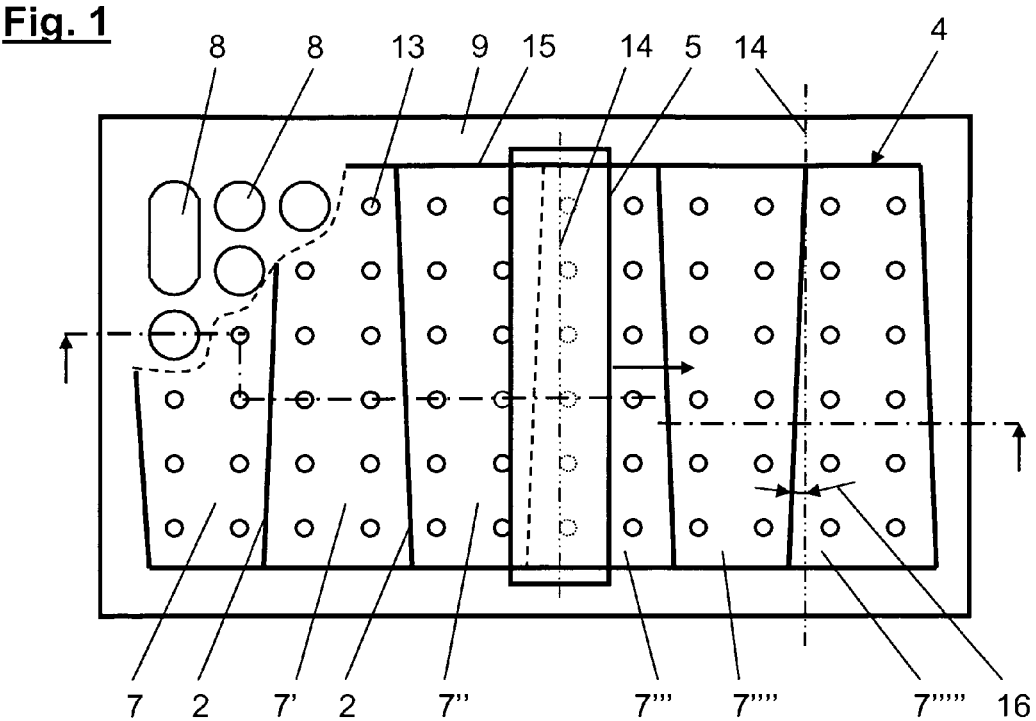

| | | | |
|---|---|---|---|
| 3,518,723 A | | 7/1970 | Wooding |
| 4,354,817 A | | 10/1982 | Gilman |
| 4,446,086 A | | 5/1984 | Molenaar et al. |
| 4,511,321 A | * | 4/1985 | Howard ........................ 425/331 |
| 5,198,233 A | * | 3/1993 | Kaiser ........................... 425/331 |
| 5,399,080 A | * | 3/1995 | Van Benthum ............... 425/331 |
| 6,375,447 B1 | * | 4/2002 | Zitron et al. ................... 425/331 |
| 6,582,638 B1 | * | 6/2003 | Key ............................... 425/331 |
| 2005/0266112 A1 | * | 12/2005 | Che ............................... 425/331 |

FOREIGN PATENT DOCUMENTS

| | | | |
|---|---|---|---|
| CN | 201214289 Y | | 4/2009 |
| CN | 201261273 Y | | 6/2009 |
| CN | 201291597 Y | | 8/2009 |
| EP | 0 363 975 A1 | | 4/1990 |
| GB | 0 870 597 A | | 6/1961 |
| GB | 0 992 352 A | | 5/1965 |
| GB | 1 016 163 A | | 1/1966 |
| JP | 59-059240 A | | 4/1984 |
| JP | H0657423 U | | 8/1994 |
| JP | 2000-202272 | * | 7/2000 |

OTHER PUBLICATIONS

International Search Report dated Jan. 26, 2011, as received in corresponding PCT Application No. PCT/EP2010/005983, 6 pages.

Office Action dated Jul. 3, 2013 issued in connection with U.S. Appl. No. 13/498,522.

Office action dated Jan. 16, 2014 issued in connection with Chinese Application No. 201080044982.4.

Office action dated Jan. 23, 2014 issued in connection with Chinese Application No. 201080044981.X.

Office action dated Mar. 25, 2014 issued in connection with U.S. Appl. No. 13/498,522.

Notice of Allowance dated Jul. 16, 2014 issued in connection with U.S. Appl. No. 13/498,522.

* cited by examiner

Fig. 5
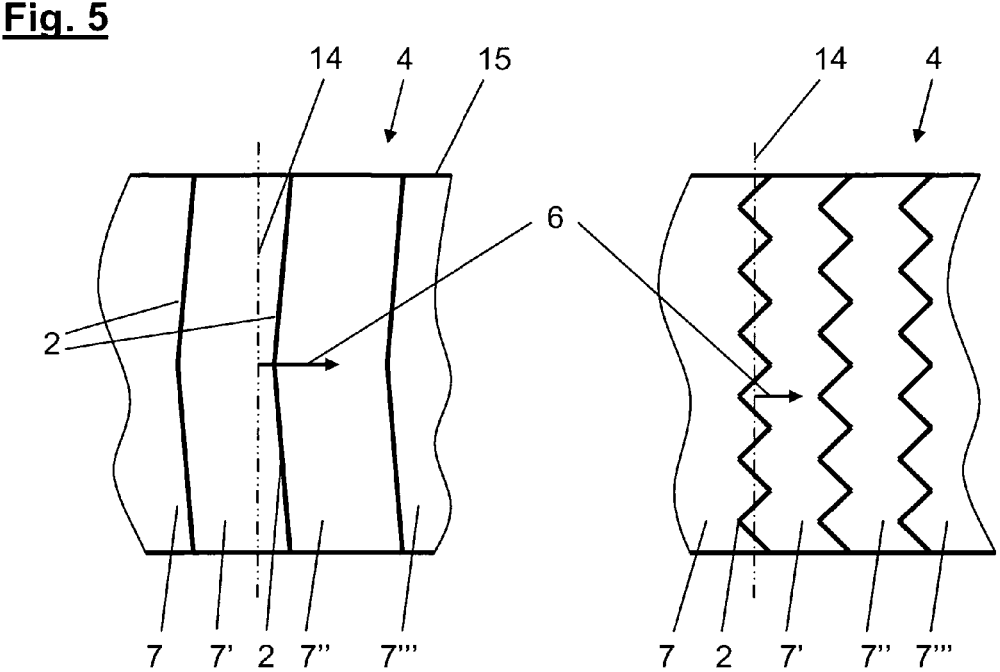
Fig. 6
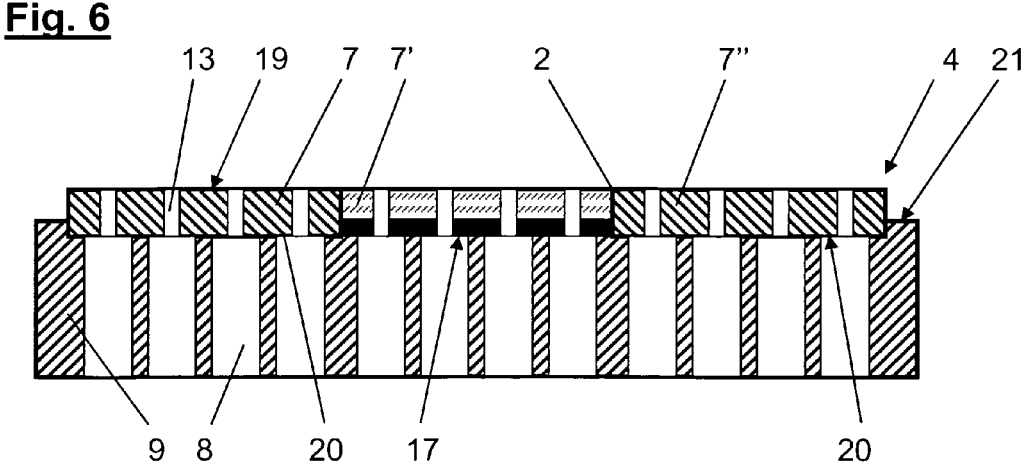
Fig. 7
Fig. 8
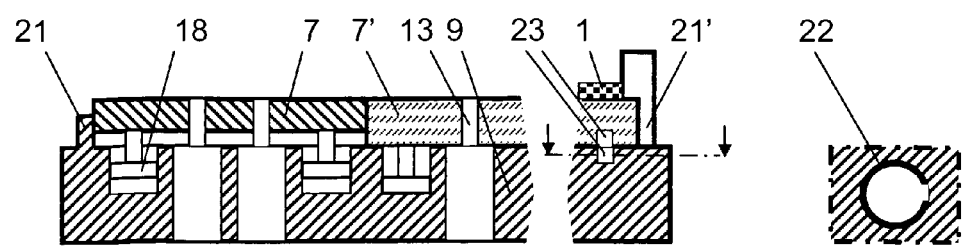

PELLETIZING PRESS FOR PRODUCING PELLETS

CROSS REFERENCE TO RELATED APPLICATIONS

The present invention is a National Stage of International Application No. PCT/EP2010/005984 filed on Sep. 30, 2010, which claims the benefit of German Patent Application No. 10 2009 047 811.6 filed on Sep. 30, 2009. The entire disclosures of which are incorporated herein by reference.

The invention relates to a pelletizing press for producing pellets.

The production of pellets, also referred to as granules, from fine material or compacted and/or molten material is already known. The production of pellets, or wood pellets from preferably chopped biomass, such as wood chips, sawdust, or the like, is also already sufficiently known and is propagated in the field of renewable energy sources as a pioneering technology for climate protection, in particular in Europe. Typically, chip material from the wood-processing industry is used as the raw material, however, freshly cut timber or types of wood which are not usable in the wood-processing industry or waste materials can also be used. Pollutant-free base material is preferably to be used for the market for wood pellets for supplying small furnace facilities in single-family or multi-family houses. Block power plants or special high-temperature furnace facilities for generating heat and/or obtaining electrical energy (combination power plants) can also cleanly combust pollutant-charged material (pellets made of particle board or medium-density fiberboard with or without a coating or lacquering) in small amounts, however.

The wood pellets are typically produced in so-called pelletizing presses, in which the material to be compressed is pressed through boreholes of a matrix by moving and/or actively rolling rollers, also referred to as pan grinder rollers. The material (biomass) is shaped by the boreholes and discharged as strands from the boreholes. Boreholes are understood as all openings which are preferably implemented as essentially cylindrical, and are arranged in a matrix to feed through and shape the material. The boreholes can also have larger intake areas (depressions) to improve the compression procedure and can be hardened or can have hardened sleeves in the boreholes. A differentiation is made between flat and ring matrices in the field of matrices. Rollers revolve externally or internally around on ring matrices for the compression, on flat matrices, the pan grinder rollers roll circularly (mill construction) or linearly reversing. The invention is preferably concerned with flat matrices of the latter construction, but can optionally also be used with ring matrices. The possibilities for preparing and scattering the biomass, or the post-processing (chopping of the strands, cooling, storage, transport) of the pellets do not have to be discussed in greater detail. Reference is made in this regard to the prior art.

Due to the warming of the climate, which has been acknowledged worldwide in the meantime, the industry has been forced to accelerate and cheapen the large-scale industrial production of wood pellets. An essential wearing part of the pelletizing presses is the matrix itself. Due to the pressing and compaction of the biomass on the walls of the boreholes, high coefficients of friction and pressures occur, which erode the matrix boreholes and enlarge them over time. Simultaneously, it can happen during the supply of the biomass that high-density elements, such as rocks, pieces of metal, or the like, reach the flat matrix and are pressed by the rolling rollers into the matrix. Distortions of the surface of the matrix or frayed areas of the boreholes arise, this in turn results in irregular compression of the residual layer of the biomass on the rolling surface of the matrix, because the biomass of the residual layer can no longer freely flow in all directions due to the disturbances of the rolling surface. A corrugated residual layer arises, which can result in incalculable machine-dynamic oscillations in the pelletizing press. However, high-density clots of the biomass also form, which in turn further damage the rolling surface of the matrix and/or cause increased wear during the passage through the boreholes. In the extreme case, faulty rolling surfaces result in "knocking" or also "banging" rollers, which are harmful overall for the pelletizing press, but also in particular for the rollers and the matrices.

However, it cannot be prevented in the nature of the production that damage or wear of the matrix occurs over a certain period of production time. The reconditioning of a matrix per se can be performed by many types of reconditioning possibilities, such as grinding/planing off the entire matrix, deposit welding in the case of depressions, or drilling out local damage or a borehole and inserting a closure or a sleeve. Matrices having wear-resistant coatings or surface hardening are sufficiently known.

In the design of a matrix for a pelletizing press, up to this point, passage boreholes have been introduced into a solid material. The solid material is designed in vertical extension, which essentially corresponds to the alignment of the passage boreholes, in such a manner that it can bear the required forces of one or more pan grinder rollers during the pelletizing procedure. This typically results in a matrix type of more than 100 mm, depending on the starting product to be compacted. In order to keep the wear within limits, hardening the matrix and/or inserting sleeves into the boreholes, which have a higher quality material and/or are replaceable (DE 27 08 562 A1), is known.

However, these solutions in turn require a high investment in order to prepare the required deep-hole boreholes in the matrix. In addition, there is the required work in order to adjust the boreholes on the intake side to the material to be compressed (e.g., expansion in conical shape) or deposit or through-hardening measures. The mentioned introduction of the wear sleeves is also time-consuming and requires very precise fits. It has therefore been shown that the matrix has become one of the most expensive machine elements of a pelletizing press in the meantime (due to the increased raw material and man-hour prices).

The object of the invention is to provide a pelletizing press of the above-mentioned type for producing pellets, which also allows a matrix to be used, which has the least possible height and therefore the shortest possible length of the boreholes.

The achievement of the object for a pelletizing press is that, to mount the matrix in the feedthrough direction of the biomass, a carrier plate pressing essentially flatly against the matrix is arranged after the matrix and at least one breach for exposing the boreholes of the matrix is arranged in the carrier plate.

A matrix made of high-quality material can advantageously now be implemented cost-effectively having the lowest possible thickness. In particular, bending-resistant mounting of the matrix is thus possible. The biomass is to be sufficiently compressed inside the matrix and is to have the required strength and consistency after exiting from the boreholes. It is ensured by the planar carrier plate that the sag of the matrix remains in a controllable scope and has no consequence on operation during the pelletizing. The matrix can therefore preferably be manufactured from a high-strength, in particular low-wear and/or very expensive material, since it is implementable and usable very "thin" or with the least possible material expenditure. Hardened materials are also conceivable, in particular the use of through hardened purchased parts, which are inexpensive to purchase and only still have to be drilled. Matrices which tend to become brittle or tend to fracture from oscillation or continuous use can be supported using an intermediate layer to the carrier plate, which results in outstanding damping in relation to harmful oscillations. A plastic plate is preferably used for this purpose, which simultaneously reduces or even prevents possible manufacturing inaccuracies or support problems on the carrier plate.

With the teaching of the invention, one is capable of implementing the matrix itself as a wearing element, which is easier to manufacture, easier to handle, and more cost-effectively replaceable because of its smaller size and accompanying minimization of weight. This is true in particular in the case of a multipart matrix, which can be readily implemented because of the carrier plate arranged in the pelletizing press. It is comprehensible that the carrier plate is again in turn supported in the pelletizing press. If the carrier plate is arranged as a ring plate, the carrier plate accepts the compression forces applied by the pan grinder rollers and distributes them according to the typical practice in the respective pelletizing press arrangement. The carrier plate in conjunction with a suitable matrix is also distinguished in this point in particular by the refining possibility for replacing existing matrices and mounting them in pelletizing presses. Therefore, it may be possible in the scope of the invention to retrofit existing pelletizing presses and to subsequently mount a matrix with a corresponding carrier plate.

In an expansion of the object in the case of a multipart matrix in a pelletizing press, the rolling of the roller can be improved at the joint edges of the matrix segments and/or the pelletizing press is to be made capable of using matrix segments of different heights with uniform quality of the rolling surface.

In particular, the present invention allows the matrix itself to be manufactured as thin as possible, for example, 30 to 100 mm tall, preferably 40 to 80 mm tall, and above all to be used without deflection. Since it can be sufficiently supported by the carrier plate, a very costly material or a through-hardened steel or a very hard steel or stainless steel can also be used for this purpose. Costly chromium steels or martensitic steels therefore no longer represent a reason for obstructing investment because of the decreased costs because of the decreased material use. It is obvious that strands exit from the boreholes of the matrix, which break apart into pellets, which have a greater or lesser length, depending on the biomass used or a pelletizing press having a scissors device for dividing the strands, which is not shown but is possible. However, it has been shown that a cutting device is not necessary after the carrier plate in most cases. Wood pellets in particular tear off independently from the biomass strand exiting from the boreholes of the matrix solely due to the vibration in the pelletizing press. In combination with special processing applications such as temperature, (natural) adhesive additive, or similar applications, however, it can occur that the strands are implemented as relatively resistant to breaking apart. In this regard, it can be advantageous to implement the passages in such a manner that they are only expanded slightly in relation to the boreholes or, with a grooved embodiment of the passages, to implement the groove extension essentially parallel to the rolling line of the roller and therefore to cut the biomass into commercially-typical pellet sizes using a cutting blade which essentially follows the same movement as the roller at regular intervals. According to the understanding of the present invention, the carrier plate or its passages does not form an extension of the boreholes of the matrix in that it does not assume a supporting or shaping task in relation to the biomass, nonetheless, depending on the embodiment variation, the passages being able to be used as stops for a movable or rotating blade for dividing the strands. Further advisable and possible embodiments are described hereafter:

To support the matrix, the carrier plate can be arranged essentially on the joint edges of the matrix segments and/or overlapping the joint at the edges of the matrix. The latter is preferably advisable in the case of narrow matrices. However, the joint edges of the matrix segments are preferably particularly supported by the carrier plate, so that sagging does not occur due to the heavy roller or even multiple heavy rollers. In particular plastic sagging on a matrix results in bulging of the joint edges and dropping or knocking rollers at the transition from one matrix segment to the next. In a preferred exemplary embodiment, an essential property of the passages of the carrier plate is that they are introduced as large as possible, possibly even as grooves or openings in the carrier plate, so that the static carrying capacity for the matrix is essentially sufficient and it experiences no or only harmless sagging. It is also advisable according to a further exemplary embodiment to implement the passages as substantially larger than the boreholes, the exiting strands, or the pellets. If mechanically cutting apart the pellets appears advisable, independently of the size of the passages, a cutting device can be arranged on the side of the carrier plate facing away from the matrix. For expedient replacement and in particular in the case of a plurality of matrix segments, it is preferable for the individual matrix segments to be essentially identical or similar. This preferably applies to the arrangement of the boreholes, the geometry, and/or the joint edges to the adjacent matrix segments.

The joint edges of the matrix segments are particularly preferably arranged essentially parallel to the rolling line of the roller. In a further exemplary embodiment, the joint edge is particularly preferably arranged essentially at an angle to the rolling line of the roller, the angle being able to cover a range between 0 and 35°.

In particular, however, to join the matrix segments to one another, it is preferable for the joint edges to be implemented as tongue-and-groove connections and/or as zigzag connections and/or as arrow-shaped connections. The above exemplary embodiments may be applied particularly advantageously in a matrix which consists of matrix segments which are arranged in a plane. The matrix would preferably be implemented as rectangular or circular for this purpose. The matrix and/or the carrier plate is particularly preferably implemented as partially or completely hardened and/or made of hardened material. In different types of embodiment of the carrier plate, it can consist of multiple carrier segments. In this case, the joint edges of the carrier segments can substantially differ from the joint edges of the matrix segments in their location to one another and/or in their embodiment. This is used to improve the support of the matrix, the special measures which were proposed above for the rolling surface not having to be applied for the joint edges of the carrier plate. Overall, the action of the carrier plate is such that the sag of the matrix is less than 0.05 mm along the rolling line of the roller, if the matrix has a width of 200 to 300 mm.

To avoid the transmission of vibrations and/or heat, an insulating and/or damping intermediate layer can be arranged between the matrix or the matrix segments and the carrier plate. This intermediate layer can be supported by a further intermediate layer for the height compensation or replaced with a correspondingly thicker intermediate layer. At least one plastic, an insulation, a metal plate, and/or a hydraulic cushion would be conceivable as the intermediate layer. The latter is preferably adjustable in its action. At least one hydraulic and/or pneumatic positioning device can be arranged between the matrix or the matrix segments on the carrier plate. This positioning device can particularly preferably be used to form a uniform rolling surface made of matrix segments of different heights. At least one plastic, an insulation, a metal plate, and/or a hydraulic cushion would be conceivable as the intermediate layer. The latter is preferably adjustable in its action. If an intermediate layer is used, the passages of the carrier plate are preferably completely or partially reproduced therein. However, only the number and the location of the boreholes can also be reproduced.

Correspondingly, in a further exemplary embodiment, a substantially larger passage in the carrier plate is assigned to at least one borehole. In addition to the matrix, the carrier plate can also consist of multiple segments, which are assembled according to typical joining methods. The carrier plate particularly preferably has substantially larger external dimensions than the matrix. Furthermore, it is advisable if at least one guide means for the fixation of the location and/or the play of the matrix to the carrier plate is arranged between the carrier plate and the matrix. Such a guide means can be at least one clamping sleeve and/or a side wall on at least one part of the edge of the matrix. The matrix particularly preferably essentially consists of a first material and the carrier plate (9) consists of a second material, the carrier plate consisting of a material of lower quality and/or lesser hardness and/or greater thickness than the matrix.

In a further positive embodiment, at least two boreholes of the matrix are combined in a breach of the carrier plate.

The matrix is preferably implemented in parts or completely as hardened and/or from hardened material and/or from at least one carbonaceous material. Of course, the matrix itself can also consist of one or more assembled parts, according to the current prior art. It is advantageous in particular if the carrier plate is implemented having such a great stiffness that bending of the matrix of no more than 0.025 mm in a section of 100 mm length occurs during operation. For example, in the case of a pan grinder roller rotating in a plane in a pelletizing press, this would mean that the ring matrix essentially has a sag of 0.05 mm in a rolling line of 250 to 350 mm, more specifically preferably a sag of 0.05 mm in 300 mm. The matrix is to be arranged having a height of approximately 30 mm to approximately 60 mm, preferably 35 to 45 mm. In contrast thereto, it is preferable that a carrier plate 9 has a height of approximately 100 mm to approximately 200 mm, preferably 125 to 175 mm. In addition to an application of the carrier plate in a flat matrix, of course, an application of the carrier plate in a ring matrix is also conceivable, the carrier plate being implemented as a carrier ring and the carrier ring being arranged on the outside or inside depending on the application of the ring matrix.

Further advantageous measures and designs of the object of the invention are disclosed in the subclaims and the following description of the drawing.

Figure 2:
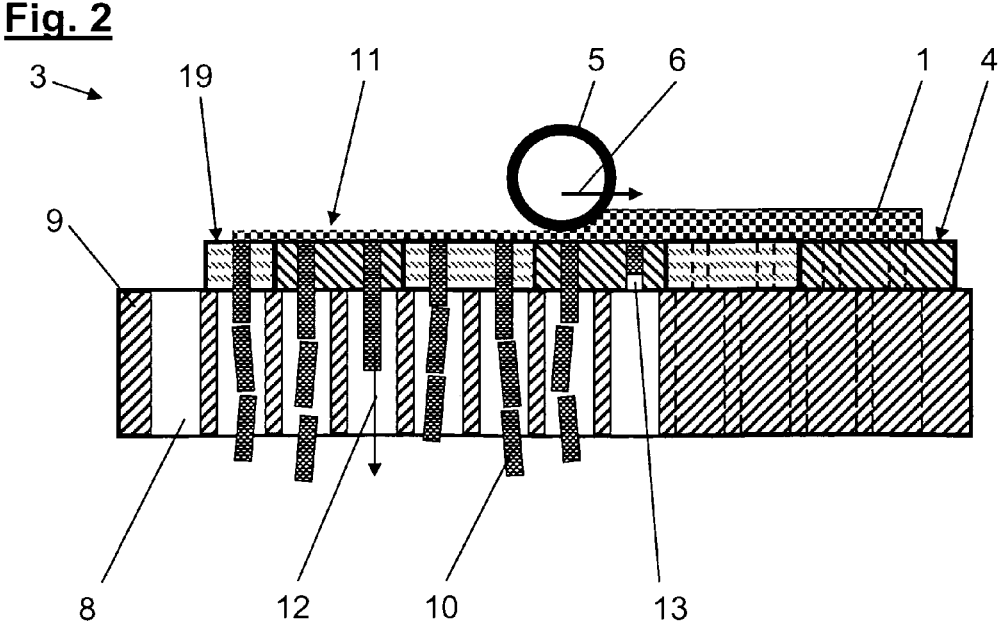
Figure 3:
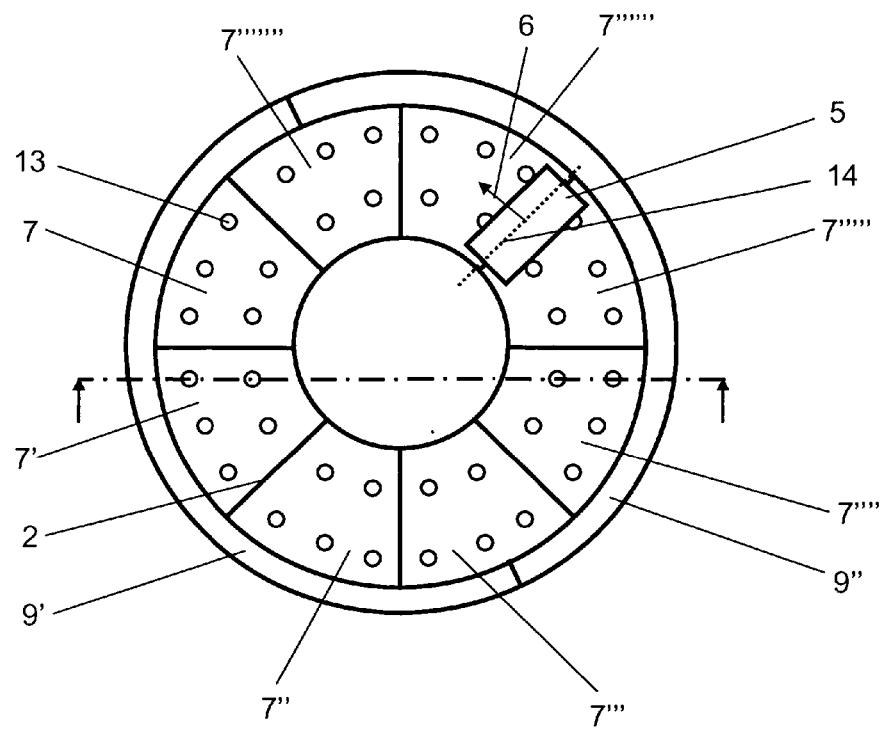
Figure 4:
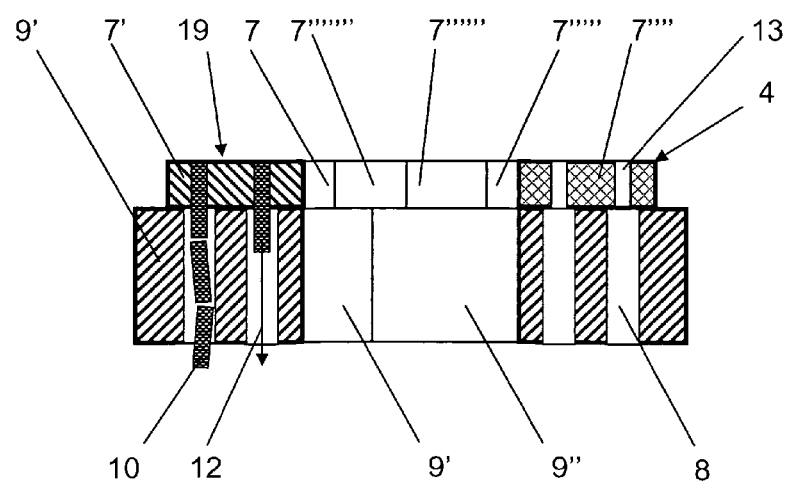

In the figures:

FIG. 1 shows a top view of a rectangular multipart flat matrix and a carrier plate located underneath in a pelletizing press having a reversing roller, FIG. 2 shows a section along section line in FIG. 1 through the multipart matrix and the carrier plate, FIG. 3 shows a top view of a multipart circular matrix having a multipart carrier plate arranged underneath in a pelletizing press having a revolving roller, FIG. 4 shows a section along a section line in FIG. 3 through the multipart matrix and the multipart carrier plate, FIG. 5 shows a simplified view of possible joint edges of the matrix segments to improve the rolling of the roller, FIG. 6 shows a section through a multipart matrix having matrix segments of different heights, FIG. 7 shows a simplified view of an actively movable and adjustable positioning device for the matrix segments or a matrix in a carrier plate, and FIG. 8 shows an enlargement of a partial section according to FIG. 7 with illustration of a clamping sleeve.

FIG. 1 shows a top view of a rectangular multipart flat matrix 4, which is laid on a carrier plate 9. A roller 5 rolls on the matrix 4 and/or the matrix 4 is moved together with the carrier plate 9 in a reversing manner from left to right and back. In the drawing, a movement to the right in the rolling direction 6 is shown in particular. The matrix 4 consists according to the drawing of six matrix segments 7, 7′, . . . , 7″″″, which are each arranged rotated by 180° and pressing against one another at the joint edges 2. The angled arrangement of the joint edges 2 having an angle 16 to the rolling line 14 of the roller 5 allows soft rolling on the matrix 4. It is unimportant whether the matrix 4 is moved, or whether the roller 5 is moved and/or the roller 5 also has an independent drive for independent rotation in addition to the movement direction. Boreholes 13 are arranged in the matrix 4, which preferably correspond to the passages 8 of the carrier plate 9. Of course, it is possible that one large passage 8 corresponds to multiple boreholes 13, as shown on the top left in FIG. 1 with the aid of a grooved passage 8.

According to FIG. 2, the biomass 1 is scattered onto the matrix during production (preferably in front of each roller 5) and pressed by the rolling roller 5 into the boreholes 13 in the direction of the feedthrough direction 12. A residual layer 11 can form on the rolling surface 19 after the passage of the roller 5. After passing through the boreholes 13, strands or pellets 10 form upon exit from the boreholes 13 on the flat side 20, which require further treatment or further transport.

An alternative embodiment of the pelletizing press 3 is shown in FIG. 3, which now uses revolving rollers 5 and a circular matrix 4 made of multiple matrix segments 7 to 7″″″, which are arranged like slices of a cake. The carrier plate also forms the foundation for a preferably thin matrix 4 here, which consists of multiple matrix segments 7 to 7″″″. The simple capability for direct replacement of damaged matrix parts and repair during operation also exists in the case of cake-shaped matrix segments 7 to 7″″″ with the same embodiment. For this purpose, at least one matrix segment 7 to 7″″″ is preferably kept in reserve in the area of the pelletizing press 3 and replaced as needed after removing a damaged matrix segment.

FIG. 4 again shows a sectional view, in a further embodiment, the carrier plate 9, 9′ being implemented in multiple parts, but having passages 8 for feeding through the pellets 10 in the feedthrough direction 12.

FIG. 5 shows multiple exemplary possibilities for connecting matrix segments 7 to 7″″″ in such a manner that the rolling line 14 of the roller 5 is not identical to the alignment of the joint edges 2. As is obvious in the left of the figure, a joint edge 2 can be implemented as an arrow edge for this purpose. The roller 5 having its rolling line 14 therefore does not roll suddenly over the joint edge 2, but rather over a longer area. A zigzag connection between multiple matrix segments 7 to 7″″″ is shown on the right side. It is also obvious here that the matrix segment 7′, for example, can be readily lifted up and replaced with a similar or identical matrix segment. In the event of unequal heights of the matrix segments after long wear and polishing or grinding procedures, an optimum rolling surface 19 is no longer ensured.

In order to nonetheless be able to use these matrix segments, it is possible according to FIG. 6 that an intermediate layer 17 is inlaid below a thinner matrix segment 7', which compensates for the height difference to the adjacent matrix segments 7 and 7". The intermediate layer 17 therefore presses against the flat side 20. In an alternative embodiment, the matrix 4 is embedded in a type of "planar groove" in the carrier plate 9, so that the matrix 4 or the matrix segments 7, 7' . . . obtain a fixation, which is required for operation, by means of the guide means 21 thus resulting. The guide means 21 can also be implemented differently, of course.

FIG. 7 shows an alternative embodiment in which positioning devices 18, which are introduced in the case of the matrix segment 7' having an original height and are correspondingly extended in the case of a matrix segment 7 of lesser height in order to implement a level rolling surface 19, are arranged in the carrier plate 9. To improve a uniform force transmission between the positioning devices 18 and the matrix segments, suitable intermediate layers can also be provided here as force distributors. Through the positioning devices 18, it would be quasi-possible to mount the matrix and/or the matrix segments on a hydraulic cushion. An alternative to a guide means 21 for the fixation of the location and/or the play of the matrix 4 to the carrier plate 9 is once again arranged in FIG. 7. This can be at least one side wall, which is installed upright or associated with the carrier plate 9, of the carrier plate 9, each is optionally provided at regular intervals. The guide means 21 is visible in section on the left in the drawing and upright on the carrier plate 9 at the right rear as a top view having reference sign 21'. The guide means 21 can be implemented in one piece with the carrier plate 9 and can represent a protrusion or a bulge in this case. Alternatively, an L-profile would be conceivable, which overlaps the matrix 4 at least in the outside area.

The guide means 21 can also be implemented as a side wall for delimiting the filling area or the rolling surface 19 of the biomass 1. Two corresponding pocket hole boreholes 23 of the matrix 4 and the carrier plate 9 are again shown in the right partial view.

FIG. 8 shows a sectional top view of an enlargement of this pocket hole borehole 23 having an inserted clamping sleeve 22. A clamping sleeve 22 has the advantage in this context that thermal expansion of the matrix or fitting inaccuracies can be readily absorbed, without the clamping sleeve 22 shearing off, in contrast to a bolt. The clamping sleeve consists of a type of tube, which has an opening in the axial direction. Slight displacement advantageously also does not worsen the result of the pelletizing, since minimal displacements or imprecise dimensional accuracies can be compensated for without difficulty due to the passages 8, which are larger than the boreholes 13.

A further exemplary embodiment for optimizing the drilling pattern on the rolling surface 19 in the case of extreme forces and/or a large number of boreholes 13 is not shown in the figures. For this purpose, the boreholes 13 in the area of a joint edge 2 of a matrix segment 7, 7', . . . , to form a uniform drilling pattern on the rolling surface 19, are arranged diagonally inside the matrix segment 7, 7' . . . in such a manner that the carrier plate 9 is not tangent in the area of the joint edge 2. In other words, this means that the boreholes 13, which extend essentially from one flat side (rolling surface 19) to the other flat side 20, are arranged diagonally from the rolling surface 19 in the direction of the adjacent boreholes 13 at the edge of one matrix segment with uniform drilling pattern. Therefore, the possible support area for the carrier plate 9 on the bottom side of the matrix segments is increased at the joint edges 2. The diagonally extending boreholes 13 are not restricted to this area or this application, however.

Fundamentally, efforts have been made to produce a matrix, preferably from a uniform steel. For example, a so-called knife steel such as X46Cr13 (1.4034) is particularly suitable for this purpose, which, having a martensitic microstructure and being stainless, represents a good compromise between corrosion resistance, service life, and susceptibility to brittle fracture. The pelletizing press 3 is particularly preferably suitable for producing pellets 10 from biomass 1 for use in fireplaces, but can also be safely and expediently used in other fields.

LIST OF REFERENCE NUMERALS

DP 1386

1 biomass
2 joint edge of 7
3 pelletizing press
4 matrix
5 roller
6 rolling direction
7 matrix segment
8 passage
9 carrier plate
10 pellets
11 residual layer
12 feedthrough direction
13 boreholes
14 rolling line
15 edges of 7
16 angle
17 intermediate layer
18 positioning device
19 rolling surface
20 flat side
21 guide means
22 clamping sleeve
23 pocket hole borehole

The invention claimed is:

1. A pelletizing press for producing pellets from biomass, the pelletizing press comprising:
   at least one matrix having a plurality of boreholes for compression of the biomass,
   at least one roller adapted to roll on a rolling surface of the matrix,
   at least one drive device for the matrix and/or the roller being arranged in the pelletizing press,
   a carrier plate comprising multiple carrier plate segments arranged below the matrix in a feedthrough direction of the biomass, and configured to press flatly against the matrix, and
   at least one opening arranged in the carrier plate, the at least one opening configured to feed through the pellets exiting from the boreholes of the matrix.

2. The pelletizing press according to claim 1, wherein the at least one opening arranged in the carrier plate has a larger area than an area of each borehole.

3. The pelletizing press according to claim 1, wherein the matrix comprises at least two matrix segments.

4. The pelletizing press according to claim 1, wherein the carrier plate has larger external dimensions than the matrix.

5. The pelletizing press according to claim 1, wherein at least one guide means is arranged between the carrier plate and the matrix for the fixation of a location and/or play of the matrix to the carrier plate.

6. The pelletizing press according to claim 5, wherein the guide means comprises at least one clamping sleeve and/or one side wall arranged on at least one part of an edge of the matrix.

7. The pelletizing press according to claim 1, wherein the matrix consists essentially of a first material and the carrier plate consists essentially of a second material, the second material having a lesser hardness and/or a greater thickness than the first material.

8. The pelletizing press according to claim 1, wherein one opening of the carrier plate is configured to feed through the pellets exiting from at least two boreholes of the matrix.

9. The pelletizing press according to claim 1, wherein at least part of the matrix is made of a hardened material, carbonaceous steel or a combination thereof.

10. The pelletizing press according to claim 1, wherein the carrier plate is implemented having a sufficiently high stiffness that a deflection of the matrix of not more than 0.025 mm on a section of 100 mm length occurs during operation.

11. The pelletizing press according to claim 1, wherein a height of the matrix is approximately 30 mm to approximately 60 mm.

12. The pelletizing press according to claim 1, wherein a height of the carrier plate is approximately 100 mm to approximately 200 mm.

13. The pelletizing press according to claim 1, wherein the matrix comprises a ring matrix, the at least one roller comprises an external or internal revolving roller, and the carrier plate comprises a carrier ring arranged on an outside or an inside of the matrix.

14. The pelletizing press according to claim 1, wherein the pelletizing press is configured to receive biomass comprised of fibers, chips, or shreds containing cellulose, lignocellulose or a combination thereof.

15. The pelletizing press according to claim 1, wherein the pelletizing press is configured to produce fireplace fuel pellets.

16. The pelletizing press according to claim 11, wherein the height of the matrix is approximately 35 mm to approximately 45 mm.

17. The pelletizing press according to claim 12, wherein the height of the carrier plate is approximately 125 mm to approximately 175 mm.

18. The pelletizing press according to claim 1, wherein a number of the openings arranged in the carrier plate corresponds to a number of the boreholes in the matrix.

19. A pelletizing press for producing pellets, the pelletizing press comprising:
- at least one matrix having a plurality of boreholes for compression of a material,
- at least one roller adapted to roll on a rolling surface of the matrix,
- at least one drive device for the matrix and/or the roller being arranged in the pelletizing press,
- a carrier plate comprising multiple carrier plate segments arranged below the matrix in a feedthrough direction of the material, and configured to press flatly against the matrix, and
- at least one opening arranged in the carrier plate, the at least one opening configured to feed through the pellets exiting from the boreholes of the matrix.

20. A pelletizing press for producing pellets from biomass, the pelletizing press comprising:
- at least one matrix having a plurality of boreholes for compression of the biomass,
- at least one roller adapted to roll on a rolling surface of the matrix,
- at least one drive device for the matrix and/or the roller being arranged in the pelletizing press,
- a carrier plate arranged below the matrix in a feedthrough direction of the biomass and is configured to press flatly against the matrix, and
- at least one opening arranged in the carrier plate, the at least one opening configured to feed through the pellets exiting from the boreholes of the matrix,
- wherein the matrix comprises at least two matrix segments and/or the carrier plate comprises multiple carrier plate segments, and
- wherein at least one intermediate layer is arranged between the carrier plate and the matrix or all matrix segments.

* * * * *